United States Patent [19]

Shibata

[11] Patent Number: 4,656,410
[45] Date of Patent: Apr. 7, 1987

[54] CONSTRUCTION OF SINGLE-PHASE ELECTRIC ROTATING MACHINE

[76] Inventor: Fukuo Shibata, No. 8-go, 3-ban, 2-chome, Taidera, Akashi-city, Hyogo-prefecture, Japan, 673

[21] Appl. No.: 764,725

[22] Filed: Aug. 12, 1985

[30] Foreign Application Priority Data

Aug. 9, 1984 [JP] Japan .................................. 59-167208
Jan. 28, 1985 [JP] Japan .................................. 60-15045
May 25, 1985 [JP] Japan .................................. 60-113000

[51] Int. Cl.⁴ .............................................. H02P 7/36
[52] U.S. Cl. .................................... 318/718; 318/724; 318/732; 310/180
[58] Field of Search ............................... 318/716–724; 310/162, 165, 180

[56] References Cited

U.S. PATENT DOCUMENTS 3,098,959 7/1963 Rosenberry, Jr. .................. 318/718
3,758,836 9/1973 Shibata ................................ 318/732

Primary Examiner—David Smith, Jr.

[57] ABSTRACT

When a single-phase electric rotating machine has a stator provided with a main armature winding which is composed of, at least, four winding circuits in such a bridge circuit way as can be formed by connecting one set of series-connected two winding circuits in parallel with the other set of series-connected two winding circuits, in the circuit between two outside electric terminals of the main armature winding, and with an exciting winding of which electric terminals are connected electrically with two intermediate electric terminals for the main armature winding, so that the main armature winding may not only supply or be supplied with a load current through the outside electric terminals but also may be supplied with an exciting current from the exciting winding through the intermediate terminals of the main armature winding, two kinds of currents can flow simultaneously in the armature winding, therefore, two different numbers of poles can be produced simultaneously in the stator, the machine can operate easily and simply as two rotating machines, and a brushless single-phase electric rotating machine having a simple construction can be designed or manufactured, if the machine has substantially two kinds of rotor windings, whether it is used as a synchronous motor or as a synchronous generator.

20 Claims, 23 Drawing Figures

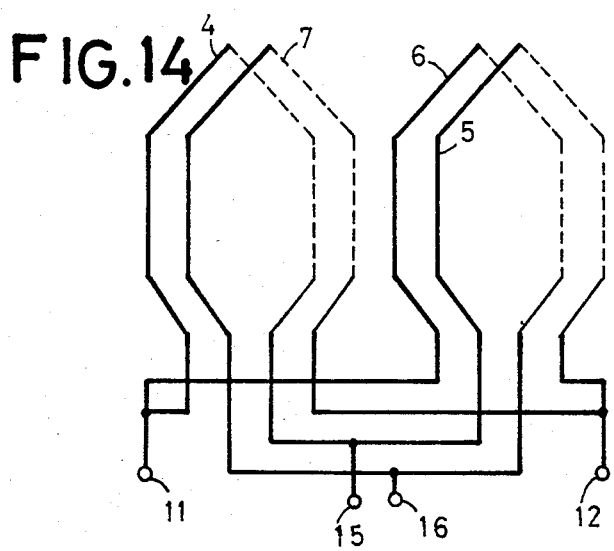

CONSTRUCTION OF SINGLE-PHASE ELECTRIC ROTATING MACHINE

BRIEF SUMMARY OF THE INVENTION

The invention described herein relates to electric machine arrangements which included electric rotating machines having stators and rotors. The following machines are shown as examples of the electric rotating machines.
1. Single-phase synchronous generator
2. Single-phase synchronous motor.

In the usual synchrous generator or motor installation, a separate direct current or alternating current generator is used for supplying the field excitation for the synchronous machine. In order to provide a brushless synchronous machine of inexpensive and simple construction capable of providing optimum performance characteristics, an already published U.S. Pat. No. 3,573,578 was invented by the inventor himself. In the U.S. Pat. No. 3,573,578, as terminals in each phase of primary and secondary winding of a transformer are respectively electrically connected with a middle point and both terminals in each phase of armature stator winding of an electric rotating machine so that electric power can be transferred between the transformer and the rotating machine, two kinds of currents can flow simultaneously in the armature winding, therefore, two different numbers of poles can be produced simultaneously in the stator, and the machine can operate as two rotating machines, when the machine has two kinds of rotor windings.

An invention of a synchronous generator is also included in the U.S. Pat. No. 3,573,578. It is not necessary to provide a separate exciter of DC or AC for supplying the field excitation for the synchronous machine in the U.S. Pat. No. 3,573,578. However, it is necessary to connect a transformer with the armature stator winding of the single-phase synchronous generator in the U.S. Pat. No. 3,573,578. As the exciting power for supplying the armature winding with the exciting current is supplied from the armature winding itself, in the U.S. Pat. No. 3,573,578, the total operating efficiency is not so high.

An object of this invention is to provide a brushless and exciterless single-phase synchronous machine of inexpensive and simple construction capacble of providing optimum performance characteristics.

Another object of this invention is to provide a brushless and exciterless single-phase synchronous machine of high operating efficiency.

This invention possesses many other advantages, and has other objects which may be made more clearly apparent from a consideration of several embodiments of this invention. For this purpose, there are shown a few forms in the drawings accompanying and forming part of the present specification. These forms will now be described in detail, illustrating the general principles of the invention, but it is to be understood that this detailed description is not to be taken in a limiting sense, since the scope of the invention is best defined by the appended claims.

BRIEF DESCRIPTION OF THE SEVERAL VIEWS OF THE DRAWING

Refering to the drawing.

FIGS. 14, 15, 16, 17, 19, 20, 22, 23 inclusive are developed drawings of windings of winding examples of this invention.

DETAILED DESCRIPTION

This invention is composed of the following combination:

an electric rotating machine having a stator provided with a main armature winding in which the load current flows and with an exciting winding for supplying the main armature winding with the exciting current, and having a rotor provided with a rotor winding; two outside electric terminals for the said electric rotating machine which lie respectively in points connected with the both ends of the said main armature winding of the said stator of the said electric rotating machine;

external circuit wires which are respectively, electrically connected with the said outside electric terminals for the said electric rotating machine, so that the load current may flow in the main armature winding through the external circuit wires;

at least four winding circuits which compose the said main armature winding in such a bridge circuit way as can be formed by connecting one set of series-connected two winding circuits in parallel with another set of series-connected two winding circuits, in the circuit between the said two outside electric terminals;

at least two intermediate electric terminals for the said main armature winding which lie respectively in each intermediate points of the said two sets of series-connected two winding circuits. electric terminals for the said exciting winding in the said stator of the electric rotating machine; and electric wires connecting between the said intermediate electric terminals for the main armature winding and the said electric terminals for the said exciting winding, so that the main armature winding may be supplied with the exciting current from the exciting winding through the said two intermediate electric terminals for the said main armature winding.

Figure 1:
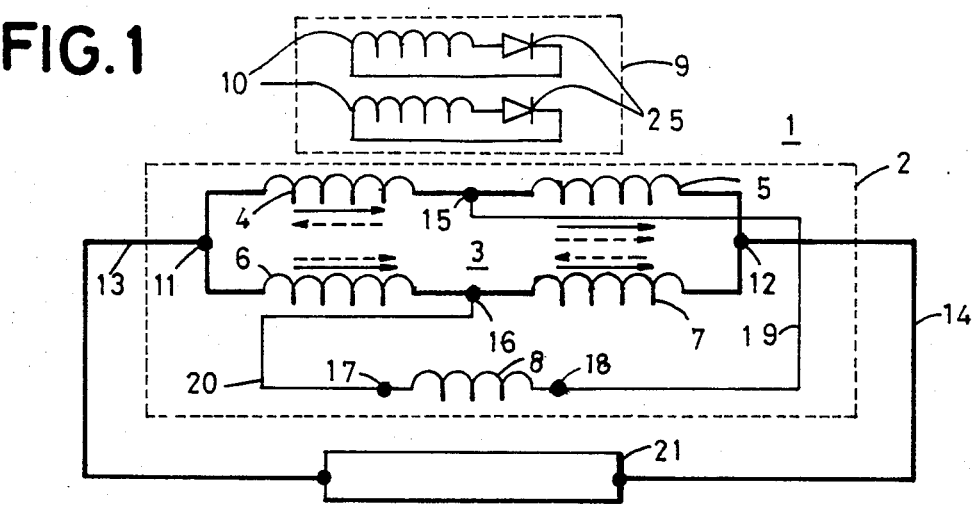
FIGS. 1 to 5 and FIGS. 12, 13 inclusive are system diagrams illustrating different forms of this invention.

In FIG. 1, a single-phase electric rotating machine arrangement is composed of an electric rotating machine 1 having a stator 2 provided with a main armature winding 3 (composed of 4, 5, 6 and 7) in which the load current flows as shown by solid lines and with an exciting winding 8 for supplying the main armature winding 3 with the exciting current, and having a rotor 9 provided with a rotor winding 10; two outside electric terminals 11, 12 for the said electric rotating machine 1 which lie respectively in points connected with the both ends of the said main armature winding 3 of the said stator 2 of the said electric rotating machine 1; external circuit wires 13, 14 which are respectively, electrically connected with the said outside electric terminals 11, 12 for the said electric rotating machine 1, so that the load current may flow, as shown by the solid lines along the windings 4, 5, 6 and 7, in the main armature winding through the external circuit wires 13, 14; at least four winding circuits 4, 5, 6 and 7 which compose the said main armature winding 3 in such a bridge circuit way as can be formed by connecting one set of series-connected two winding circuits 4-5 in parallel with another set of series-connected two winding circuits 6-7, in the circuit between the said two outside electric terminals 11 and 12; at least two intermediate electric terminals 15, 16 for the said main armature winding 3 which lie respectively in each intermediate points of the said two sets of series-connected two winding circuits 4-5 and 6-7; electric terminals 17, 18 for the said exciting winding 8 in the said stator 2 of the electric rotating machine 1; and electric wires 19, 20 connecting between the said intermediate electric terminals 15, 16 for the main armature winding 3 and the said electric terminals 17, 18 for the said exciting winding 8, so that the main armature winding 3 may be supplied with the exciting current from the exciting winding 8 through the said two intermediate electric terminals 15, 16 for the said main armature winding 3. The two outside electric terminals 11 and 12 are connected electrically with an electric machine 21. When the electric machine 21 is an AC motor, the electric rotating machine 1 becomes a single phase synchronous generator. When the electric machine 21 is a synchronous generator, the electric rotating machine 1 becomes a single-phase synchronous motor. FIG. 14 and FIG. 15 show examples of winding connections used as a main armature winding 3 in FIG. 1. It can be understood that in FIG. 14, 4 poles of magnetic field can be obtained in case of flowing the load current in the main armature winding, and 2 poled of magnetic field are made in case of flowing the exciting current in the main armature winding. It can also be understood that in FIG. 15, 2 poles of magnetic field can be made in case of flowing the load current in the main armature winding, and 4 poles of magnetic field are made in case of flowing the exciting current in the main armature winding. Solid lines and dotted lines in FIG. 1, FIG. 14 and FIG. 15 show instantaneous directions of alternating currents.

Figure 6:
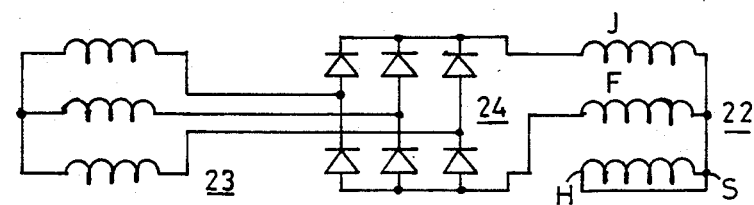
FIGS. 6 to 9 are part system diagrams illustrating different forms of this invention.
Figure 7:
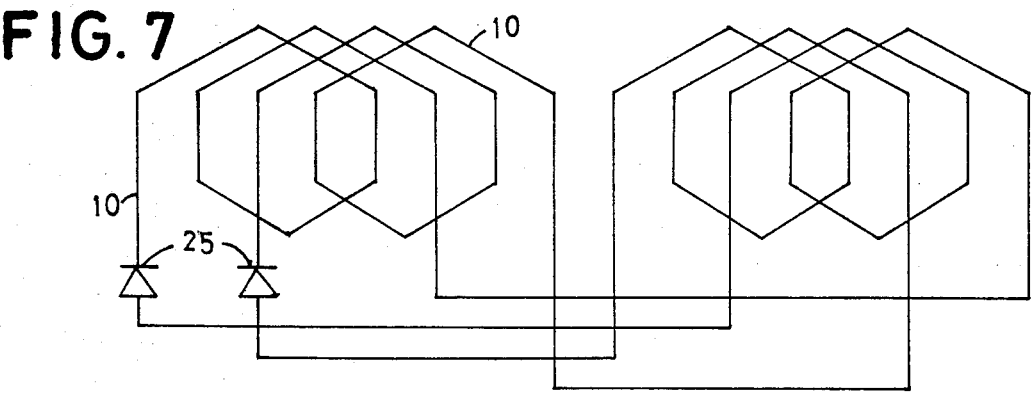

In FIG. 1, the rotor may be provided with; a multipole field winding 22 of FIG. 6 comprising conductors mounted in the rotor slots, and having the same number of poles as that of the main armature winding 3 of the electric rotating machine 1 obtained by a load current flowing into and out from the outside electric terminals 11, 12; a multipole exciting secondary winding 23 of FIG. 6 comprising conductors located in the same slots as the conductors of the field winding, and having the same number of poles as that of the main armature winding 3 of the electric rotating machine 1 obtained by the current which is made to flow in the main armature winding 3 of the electric rotating machine 1 by the electromotive force induced in the exciting winding 8; and rectifier means 24 of FIG. 6 mounted on the rotor for supplying unidirectional current flow from the exciting secondary winding 23 to the field winding 22. The field winding 22 is composed of a three phase winding H, F and J. The two phase winding F and J is used for direct current winding, and the other winding H is used as a damper winding. The winding H is shorted by the point S. An example of developed winding diagrams of the rotor 9 in FIG. 1 is shown in FIG. 7. The rotor windings 10 are connected electrically in series with rectifiers 25 respectively. The rotor windings 10 have the same number of poles as that of the main armature winding 3 of the electric rotating machine 1 obtained by the current which is made to flow in the main armature winding 3 of the electric rotating machine 1 by the electromotive force induced in the exciting winding 8.

Figure 18:
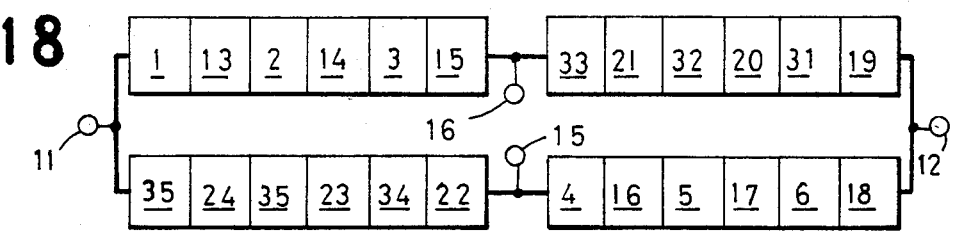
FIGS. 18 and 21 are respectively simple diagrams of FIGS. 19-20 and FIGS. 22-23.
Figure 19:
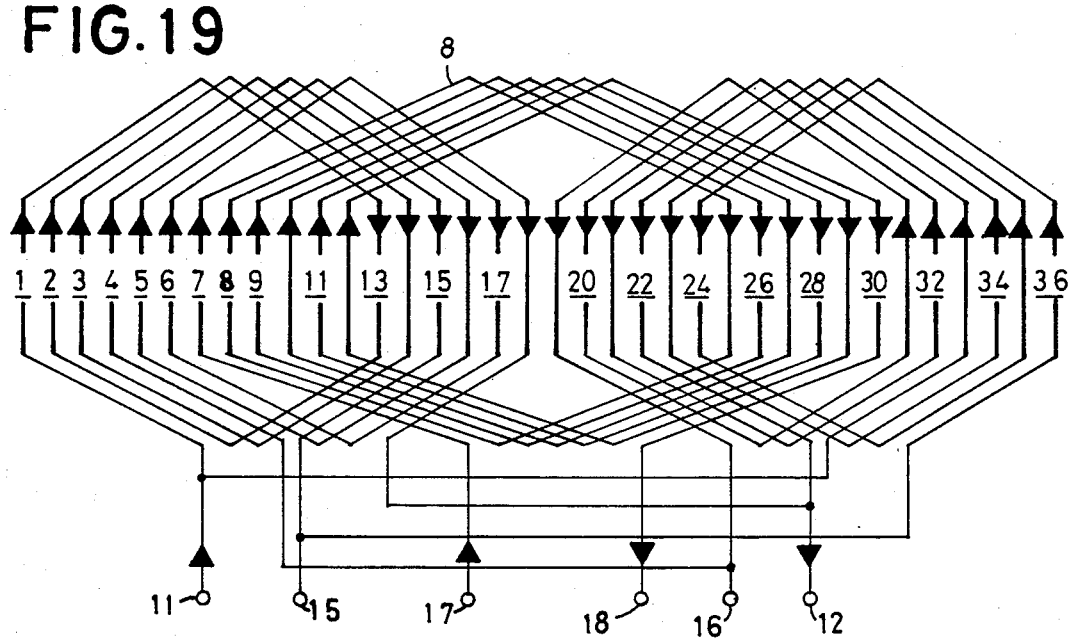
Figure 20:
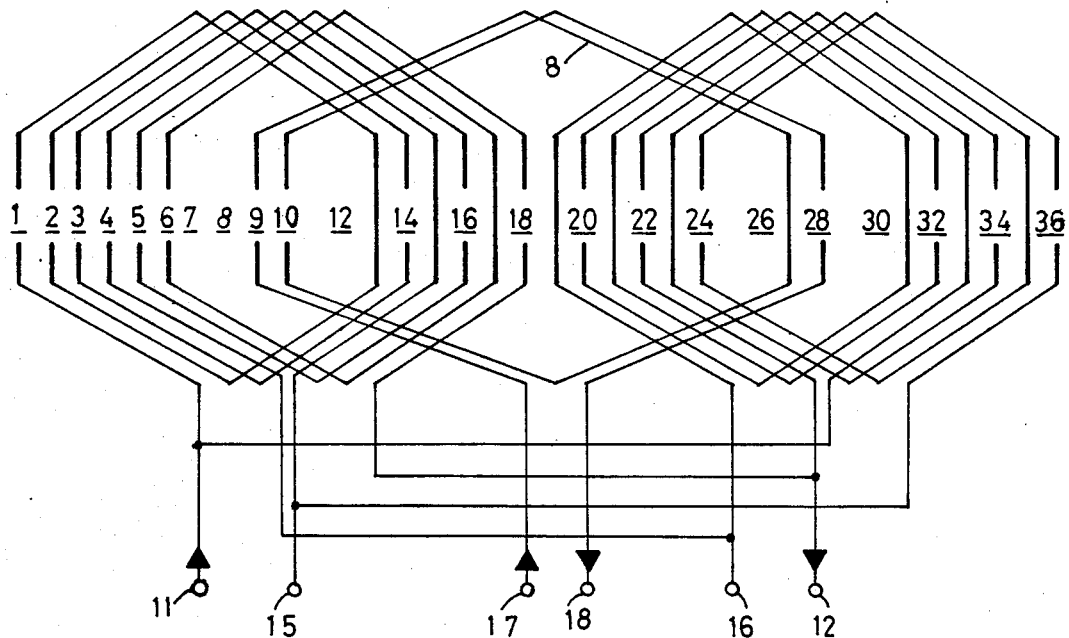

FIG. 19 shows a developed winding diagram. Symbols 11, 12, 15, 16, 17 and 18 in FIG. 19 indicate respectively the same meanings as those of the same symbols in FIG. 1. In general, all slot spaces are not utilized effectively. However, in this invention, the slot spaces which generally have not been utilized, about ⅓ of all slot spaces can be used for being provided with the exciting winding 8. Numbers of 1 to 6, 13 to 24, and 31 to 36 written on the coil sides are slot numbers for the main armature winding. Numbers of 7 to 12 and 25 to 30 written on the coil sides are slot numbers for the exciting winding. It can be seen from the arrangement of FIG. 19 and FIG. 20 that a part of all coil sides of the at least four winding circuit forming the main armature winding are placed, in a single layer way, in a part of all slots of the stator 2 of the electric rotating machine 1, and all coil sides of the exciting winding 8 are placed, in single layer way, in another part of all slots of the stator 2 of the electric rotating machine 1. FIG. 18 is a simple connection of the developed winding diagram, FIG. 19. FIG. 20 is the same developed winding diagram as FIG. 19, except that all slot spaces which are not utilized for being provided with the armature winding 3 in the stator 2 are not so completely used for the exciting winding in FIG. 20 as in FIG. 19. Only 4 slots are used for the exciting winding 8, in FIG. 20, Arrows in FIGS. 19 and 20 show instantaneous directions of currents made by electromotive forces induced in all coil sides of the main armature winding 3 and the exciting winding 8.

Figure 21:
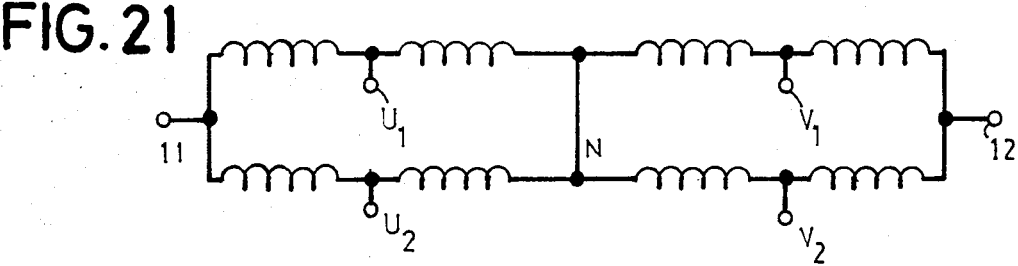
Figure 22:
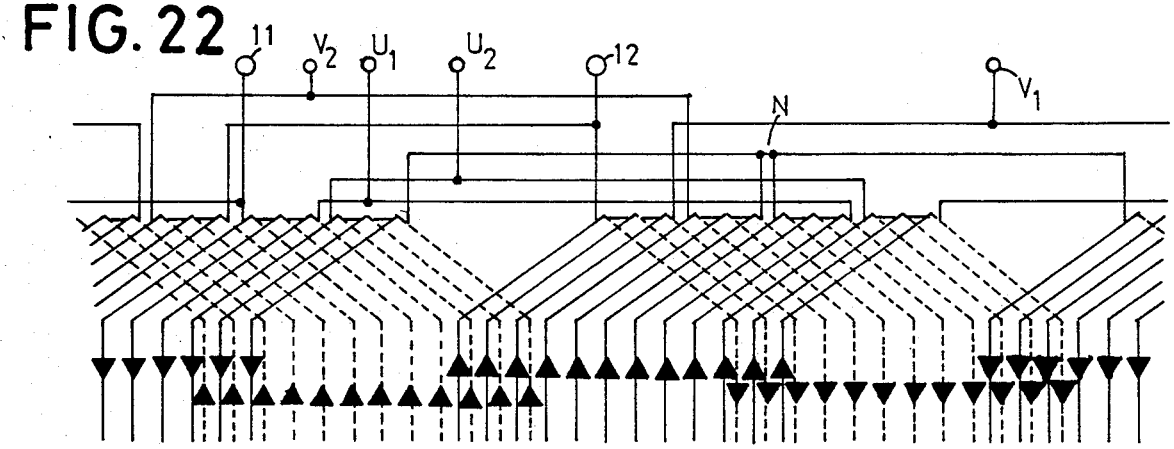
Figure 23:
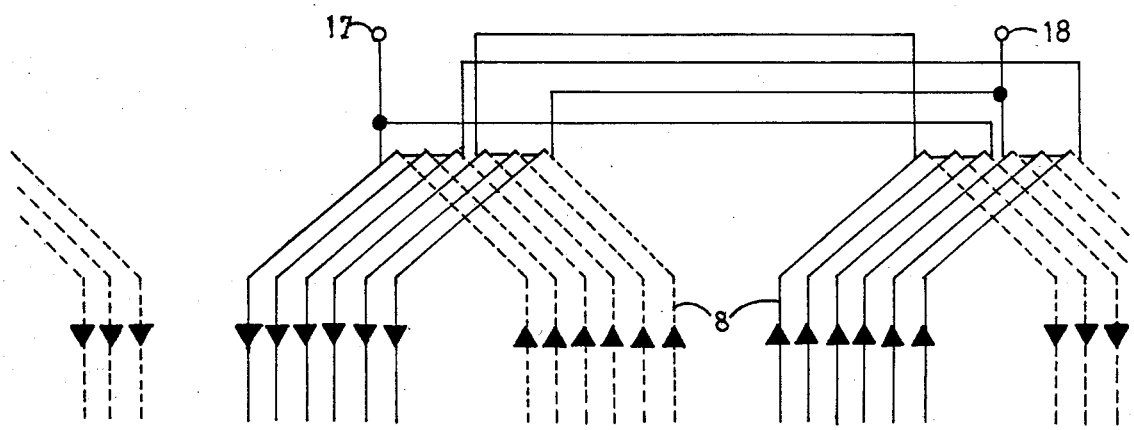

In FIG. 22, it is shown that at least a part of all coil sides of the at least four winding circuits 4, 5, 6, 7 forming the main armature winding 3 are placed, in a double layer way, in a part of all slots of the stator 2 of the electric rotating machine 1. For the exciting winding 8 shown in FIG. 23, the slot spaces which have not been utilized for the main armature winding 3 can be used in FIG. 22. Thus, it can be found from FIGS. 22 and 23 that at least a part of all coil cides of the at least four winding circuits forming the main armature winding 3 are placed, in a double layer way, in a part of all slots of the stator 2 of the electric rotating machine 1, and all coil sides of the exciting winding 8 are placed, together with a part of all coil sides of the at least four winding circuits 4-5, 6-7 forming the main armature winding 3, in a double layer way, in another part of all slots of the stator 2 of the electric rotating machine 1. Arrows in FIG. 22 show instantaneous directions of the load current in the main armature winding 3. It can be seen from FIG. 22 that 2 poles of a magnetic field is made by the load current. Arrows in FIG. 23 show instantaneous directions of the current flowing in the exciting winding 8 by the electromotive force induced in the exciting winding 8. The number of the magnetic poles of the exciting winding 8 is the same as that of the main armature winding 3 made by flowing of the load current. FIG. 21 shows a simple diagram of FIG. 22.

Figure 8:
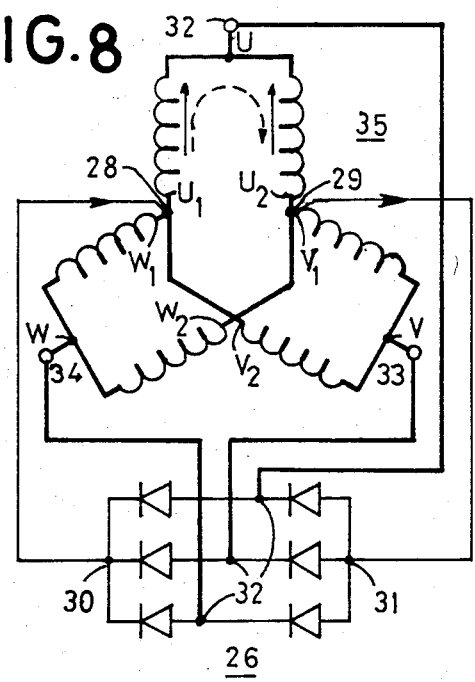

In a single-phase electric machine, generally, we are troubles with the problem of distortion of the voltage wave form which occurs by special armature reaction based on alternating field. In order to cancel the distortion of the voltage wave form and to make a sinusoidal voltage wave, it is preferable to use a polyphase rotor winding. FIG. 8 shows an example of such a three-phase rotor winding as can be used as a polyphase rotor winding of this invention. The rotor winding shown in FIG. 8 is composed of double-star three phase windings 35 having two neutral points 28 and 29 between which is connected electrically a DC circuit 30-31 of a rotating rectifier 26 of which the AC terminals 32 are connected electrically with outside terminals 32, 33, 34 of the said double star three phase windings 35. As the number of magentic poles made by flowing of the AC current in the rotor windings in FIG. 8 is the same as the main armature winding 3 made by flowing of the exciting current supplied from the exciting winding 8, an AC current made to flow by an AC electromotive force flows in the AC circuit of the rotating rectifier 26, as shown by solid lines in FIG. 8.

Figure 2:
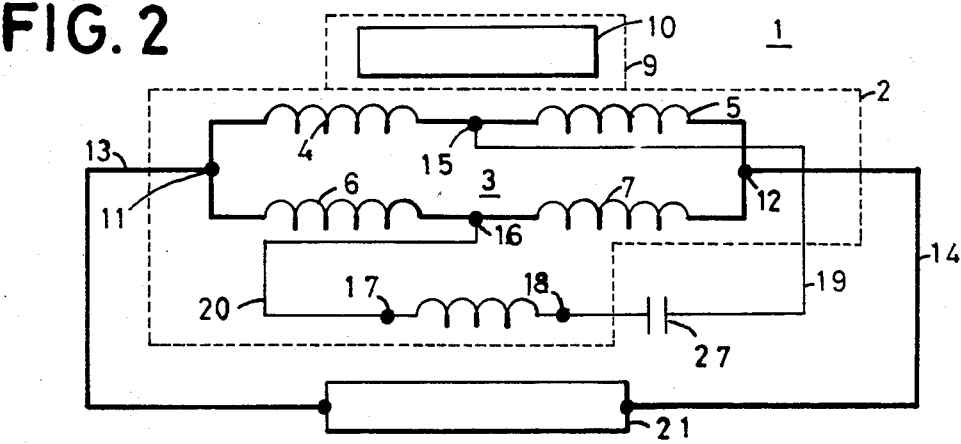

FIG. 2 shows that a condenser 27 can be connected in series with the exciting winding 8 to the main armature winding 3 in the electric circuit between the exciting winding 8 and the main armature winding 3. It is shown by a block symbol in FIG. 2 that the rotor 9 is provided with the rotor winding 10.

Figure 3:
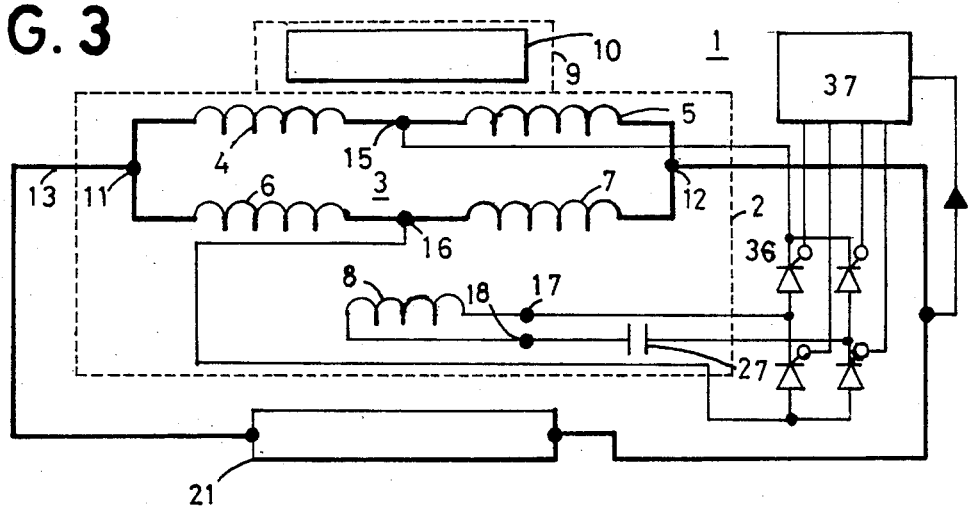

In FIG. 3, the intermediate electric terminals 15, 16 for the main armature winding 3 are connected electrically with the electric terminals 17, 18 for the exciting winding 8 through a rectifier circuit, so that the main armature winding 3 may be supplied with DC exciting current formt the exciting winding 8. Specially in FIG. 3, the intermediate electric terminals 15 and 16 for the main armature winding 3 are connected electrically with the electric terminals 17 and 18 for the exciting winding 8 through a control rectifier circuit 36 of which the control elements are connected with the control device 37, so that the main armature winding 3 may be supplied with controlled DC exciting current from the exciting winding 8.

Figure 4:
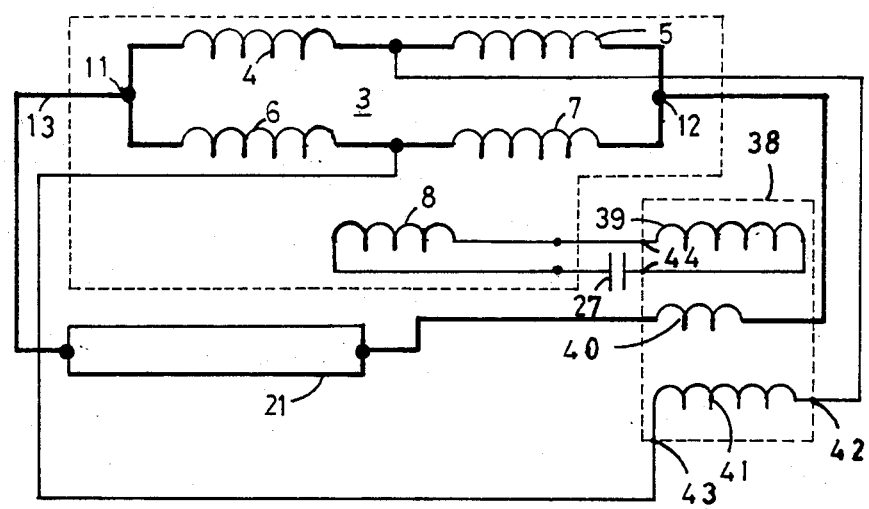

In FIG. 4, a three winding transformer 38 is connected electrically between the exciting winding 8 and the main armature winding 3. The three winding transformer 38 is provided with a voltage winding 39 which is connected with the exciting winding 8 through a condenser 27, a current winding 40 which is connected in series with the load 21 and a secondary winding 41. It can be thus described easily from FIG. 4 that in this invention, there is an apparatus 38 for combining vectorically the voltage element of the exciting winding with the current element of the main armature winding of which the input terminals 44 are connected to the exciting winding 8 and the output terminals 42, 43 are connected to the intermediate electric terminals 11, 12 of the main armature winding 3.

Figure 9:
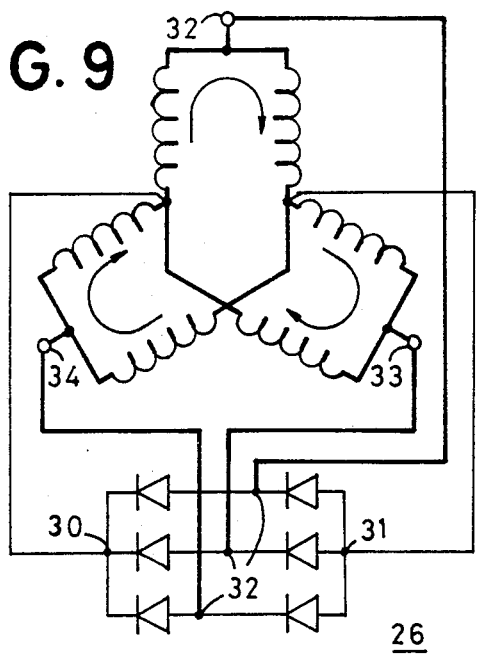

In FIG. 9, it can be so arranged in this invention that the electric rotating machine can be started as a motor by a torque between a circulating current shown by arrows in FIG. 9 flowing in the double star three-phase windings and a rotating magnetic field made by the main armature winding through the flowing of the load current.

Figure 5:
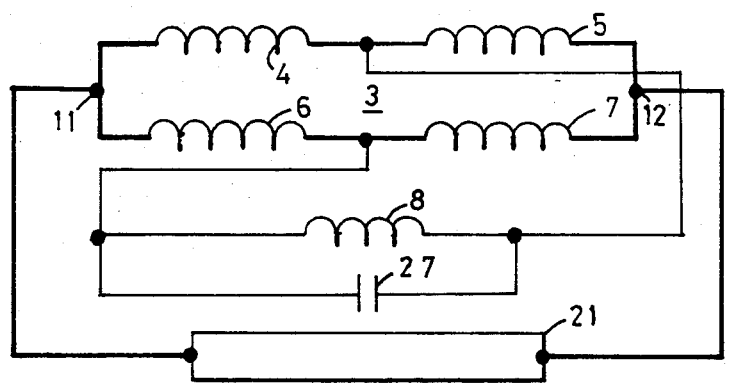
Figure 10:
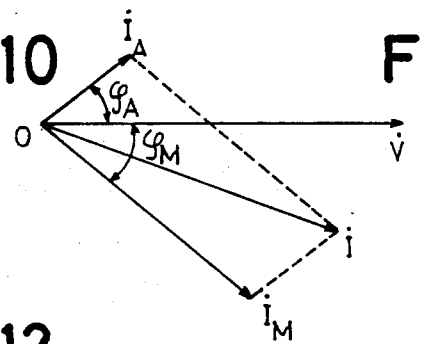
FIGS. 10 and 11 are vector diagrams illustrating performance of this invention.
Figure 11:
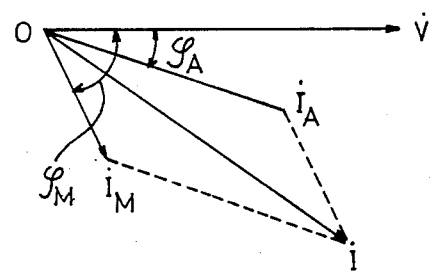
Figure 12:
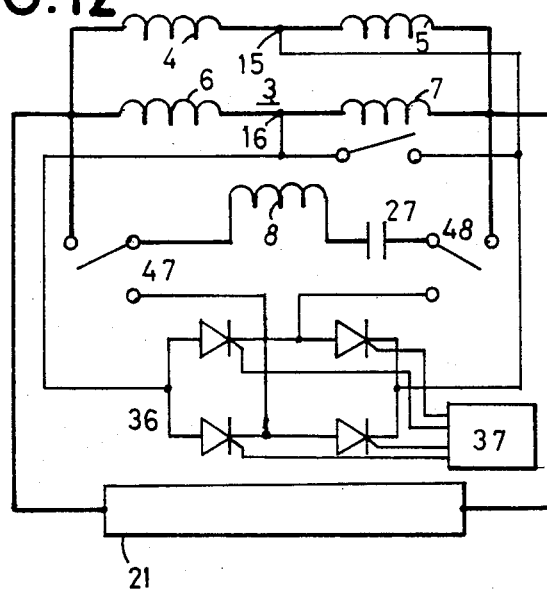
Figure 13:
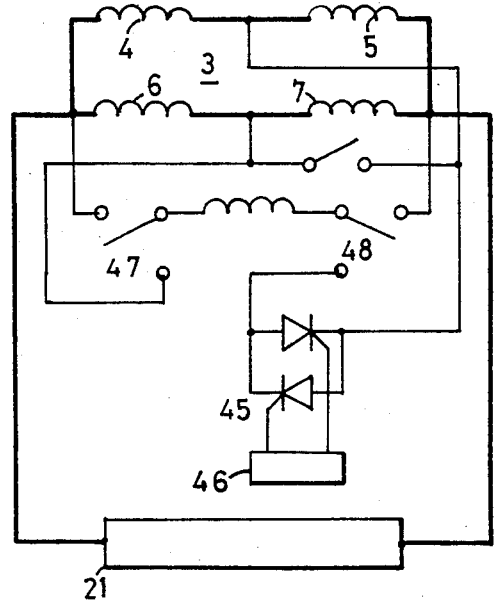

FIG. 5 shows that the condenser 27 can be connected electrically in parallel with the exciting winding 8 to the main armature winding 3, in this invention. FIG. 12 and FIG. 13 shows that the exciting winding 8 can be used as an auxiliary winding in case of being started as a synchronous motor. FIG. 10 and FIG. 11 show respectively vector diagrams in case of starting of synchronous motors in FIG. 12 and 13. Switching devices 47 and 48 can be changed over the connecting and disconnecting of the circuits. Controlled rectifiers 45 with the control device 46 can be used for control the AC circuit.

FIG. 16 and FIG. 17 are exampled of developed winding diagrams of FIG. 8. Arrows of FIGS. 16 and 17 show respectively instantaneous directions of currents of DC and AC in the circuit of FIG. 8.

It can be found from FIG. 16 and FIG. 17 that magnetic poles different between FIG. 16 and FIG. 17 can be produced.

I claim:

1. A single-phase electric rotating machine arrangement which comprises in combination:
    an electric rotating machine having a stator provided with a main armature winding in which the load current flows and with an exciting winding for supplying the main armature winding with the exciting current, and having a rotor provided with a rotor winding;
    two outside electric terminals for the said electric rotating machine which lie respectively in points connected with the both ends of the said main armature winding of the said stator of the said electric rotating machine;
    external circuit wires which are respectively, electrically connected with the said outside electric terminals for the said electric rotating machine, so that the load current may flow in the main armature winding through the external circuit wires;
    at least four winding circuits which compose the said main armature winding in such a bridge circuit way as can be formed by connecting one set of series-connected two winding circuits in parallel with another set of series-connected two winding circuits, in the circuit between the said two outside electric terminals;
    at least two intermediate electric terminals for the said main armature winding which lie respectively in each intermediate points of the said two sets of series-connected two winding circuits;
    electric terminals for the said exciting winding in the said stator of the electric rotating machine; and
    electric wires connecting between the said intermediate electric terminals for the main armature winding and the said electric terminals for the said exciting winding, so that the main armature winding may be supplied with the exciting current from the exciting winding through the said two intermediate electric terminals for the said main armature winding.

2. A single-phase electric rotating machine arrangement which comprises in combination as set forth in claim 1, at least a part of all coil sides of the at least four winding circuits forming the main armature winding are placed, in a single layer way, in a part of all slots of the stator of the electric rotating machine, and all coil sides of the exciting winding are places, in a single layer way, in another part of all slots of the stator of the electric rotating machine.

3. A single-phase electric rotating machine arrangement which comprises in combination as set forth in claim 1, at least a part of all coil sides of the at least four winding circuits forming the main armature winding are placed, in a double layer way, in a part of all slots of the stator of the electric rotating machine, and all coil sides of the exciting winding are placed, together with a part of all coil sides of the at least four winding circuits forming the main armature winding, in a double layer way, in another part of all slots of the stator of the electric rotating machine.

4. A single-phase electric rotating machine arrangement which comprises in combination as set forth in claim 1, in which the rotor winding is composed of at least one which is wound for having the same number of poles as the main armature winding made by flowing of the exciting current in the main armature winding, and is connected in series with a rectifier.

5. A single-phase electric rotating machine arrangement which comprises in combination as set forth in claim 1, in which, in addition to the four winding circuits constructing the main armature winding which are said in claim 1, four winding circuits which are newly constructed by connecting one set of series-connected two winding circuits in parallel with the other sets of series-connected two winding circuits are connected in series with the four winding circuits which are said in claim 1 in the circuit between the two outside electric terminals for the electric rotating machine.

6. A single-phase electric rotating machine arrangement which comprises in combination as set forth in claim 1, in which the rotor winding is composed of a polyphase winding.

7. A single-phase electric rotating machine arrangement which comprises in combination as set forth in claim 6, in which the rotor winding is composed of double-star three-phase windings having two neutral points between which is connected electrically a DC circuit of a rotating rectifier of which the AC terminals are connected electrically with outside terminals of the said double-star three-phase windings.

8. A single-phase electric rotating machine arrangement which comprises in combination as set forth in claim 1, in which a condenser is connected in series with the exciting winding to the main armature winding in the electric circuit between the exciting winding and the main armature winding.

9. A single-phase electric rotating machine arrangement which comprises in combination as set forth in claim 1, in which the intermediate electric terminals for the main armature winding are connected electrically with the electric terminals for the exciting winding through a rectifier circuit, so that the main armature winding may be supplied with DC exciting current from the exciting winding.

10. A single-phase electric rotating machine arrangement which comprises in combination as set forth in claim 9, in which the intermediate electric terminals for the main armature winding are connected electrically with the electric terminals for the exciting winding through a control rectifier circuit of which the control elements are connected with the control device, so that the main armature winding may be supplied with controlled DC exciting current form the exciting winding.

11. A single-phase electric rotating machine arrangement which comprises in combination, as set forth in claim 1, in which the rotor is so arranged that can be started as a motor by a torque between a circulating current flowing in the double-star three-phase windings and a rotating magnetic field.

12. A single-phase electric rotating machine arrangement which comprises in combination, as set forth in claim 1, in which a condenser is connected in parallel with the exciting winding to the main armature winding in the electric circuit between the exciting winding and the main armature winding.

13. A single-phase electric rotating machine arrangement which comprises in combination, as set forth in claim 1, in which the outside electric terminals of the electric rotating machine are electrically connected with a load terminals through the external circuit wires so that the electric rotating machine may operate as a single-phase alternator.

14. A single-phase electric rotating machine arrangement which comprises in combination as set forth in claim 1, in which the outside electric terminals of the electric rotating machine are electrically connected with a generator ternals through the external circuit wires so that the electric rotating machine may operate as a single-phase motor.

15. A single-phase electric rotating machine arrangement which comprises in combination as set forth in claim 1, in which the intermediate electric terminals for the main armature winding are connected electrically with the electric terminals for the exciting winding not through a rectifier circuit but only through an AC circuit, so that the main armature winding may be supplied with AC exciting current from the exciting winding.

16. A single-phase electric rotating machine arrangement which comprises in combination, as set forth in claim 1, in which the exciting winding, in case of flowing the exciting current in the exciting winding has the same number of poles as the main armature winding in case of flowing the load current in the main armature winding.

17. A single-phase electric rotating machine arrangement which comprises in combination, as set forth in claim 1, in which there is an apparatus for combining vectorically the voltage element of the exciting winding with the current element of the main armature winding of which the input terminals are connected to the exciting winding and the output terminals are connected to the intermediate electric terminals of the main armature winding.

18. A single-phase electric rotating machine arrangement which comprises in combination as set forth in claim 1, in which the rotor winding is so arranged that it may have simultaneously two kinds of numbers of poles corresponding to those of the main armature winding: one corresponds to the number of poles of the main armature winding made by flowing the load current in the armature winding and the other corresponds to that of the main armature winding by flowing the exciting current in the exciting winding.

19. A single-phase electric rotating machine arrangement which comprises in combination as set forth in claim 1, in which the exciting winding of the stator is so arranged that it can be used as an auxiliary winding connected in parallel with the main armature winding in the circuit supplied from the AC source, when the electric rotating machine is started as a motor.

20. A single-phase electric rotating machine arrangement which comprises in combination, as set forth in claim 1, in which the rotor winding is composed of a field winding which has the same number of poles as the main armature winding made by flowing the load current in the armature winding and a rotating exciting winding which has the same number of poles as the main armature winding made in case of flowing the exciting current in the main armature winding, and is connected with the said field winding through a rotating rectifier.

* * * * *